(12) United States Patent
Bijlenga

(10) Patent No.: US 6,480,403 B1
(45) Date of Patent: Nov. 12, 2002

(54) HVDC DEVICE FOR CONVERTING BETWEEN ALTERNATING VOLTAGES AND DIRECT CURRENT VOLTAGES

(75) Inventor: Bo Bijlenga, Skultuna (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/601,114

(22) PCT Filed: Dec. 10, 1998

(86) PCT No.: PCT/SE98/02273

§ 371 (c)(1),
(2), (4) Date: Jul. 27, 2000

(87) PCT Pub. No.: WO99/40676

PCT Pub. Date: Aug. 12, 1999

(30) Foreign Application Priority Data

Jan. 27, 1998 (SE) .............................................. 9800205

(51) Int. Cl.[7] .............................................. H02M 5/42
(52) U.S. Cl. .......................................... 363/98; 363/132
(58) Field of Search .............................. 363/95, 97, 98, 363/131, 132, 17

(56) References Cited

U.S. PATENT DOCUMENTS

| | | | |
|---|---|---|---|
| 3,757,140 A | * 9/1973 | Gurwicz et al. | 307/252 |
| 4,443,841 A | * 4/1984 | Mikami et al. | 363/41 |
| 5,617,308 A | 4/1997 | Weise et al. | 363/98 |
| 5,801,936 A | * 10/1998 | Mori et al. | 363/132 |
| 5,910,892 A | * 6/1999 | Lyons et al. | 363/98 |

FOREIGN PATENT DOCUMENTS

EP 0 533 158 A2 3/1993

* cited by examiner

Primary Examiner—Jeffrey Sterrett
Assistant Examiner—Gary L. Laxton
(74) Attorney, Agent, or Firm—Connolly Bove Lodge & Hutz LLP

(57) ABSTRACT

A device for converting alternating voltage to direct voltage and, conversely, direct voltage into alternating voltage. A series connection between the poles of a direct voltage side has at least four units each having a semiconductor element of turn-off type and a first diode connected in anti-parallel therewith. A first midpoint of the series connection is connected to an alternating voltage phase line and forms a phase output. Second midpoints of the series connection are connected to a midpoint of the direct voltage side through such units. An apparatus is adapted to control the semiconductor elements with a pulse width modulation frequency of at least one order of magnitude higher than the fundamental frequency of the alternating voltage of the phase line and the rest of the semiconductor elements with a frequency substantially lower and within or close to the frequency range of one or a couple of times of the fundamental frequency.

20 Claims, 2 Drawing Sheets

HVDC DEVICE FOR CONVERTING BETWEEN ALTERNATING VOLTAGES AND DIRECT CURRENT VOLTAGES

FIELD OF THE INVENTION AND PRIOR ART

The present invention relates to a device for converting alternating voltage into direct voltage and conversely, which comprises a series connection of at least four units each consisting of a semiconductor element of turn-off type and a first diode connected in anti-parallel therewith, said series connection being arranged between two poles, a positive one and a negative one, of a direct voltage side of the device, an alternating voltage phase line connected to a first mid point, which is called phase output, of the series connection between two units while dividing the series connection into two parts, means adapted to provide a mid point between the two poles on said direct voltage side and put these poles on the same voltage but with opposite signs with respect to the mid point of the direct voltage side, a second mid point of each said part of the series connection being through a second diode with the conducting direction with respect to the phase output opposite to the conducting direction of the first diode in the unit arranged between this second mid point and the phase output connected to the mid point of the direct voltage side and an apparatus for controlling the semiconductor elements of the units to generate a train of pulses with determined amplitudes according to a pulse width modulation pattern on the phase output of the device by alternatingly connecting the alternating voltage phase line to at least the mid point, the plus pole and the minus pole of the direct voltage side.

Such devices may be used in all kinds of situations, in which direct voltage is to be converted into alternating voltage or conversely, in which examples of such uses are in stations of HVDC-plants (high voltage direct current), in which direct voltage normally is converted into a three-phase alternating voltage or conversely or in so called back-to-back-stations in which alternating voltage is firstly converted into direct voltage and this is then converted into alternating voltage, as well as in SVCs (Static Var Compensator), in which the direct voltage side consists of one or more capacitors hanging freely.

Such converter devices already known have a number of drawbacks, when these are used for transmitting high powers, and the present invention aims at a converter device being well suited to transmit high powers, although the invention is not restricted to this field of use, since a converter device of this type may very well find other field of uses. However, the case of transmitting high powers will for this reason hereinafter be discussed for eliminating but not in any way restricting the invention.

The device defined in the introduction is a so called multi-level converter, since it may deliver at least three different phase potentials on said phase output. Different types of such multi-level converters of this voltage stiff so called VSC-type (Voltage Source Converter) for high power applications have been described in the IEEE-article IEEE Trans. on Ind. Appln. Vol 32, no 3, 1996, pages 509–517. Three different types of multi-level converters are described therein, namely multi-level converters with clamping diodes, multi-level converters based upon flying capacitors and multi-level converters based upon cascaded converters. Only the two first ones are suitable for transmitting active power, such as for example in HVDC- and back-to-back-applications. The greatest problem of multi-level converters having clamping diodes is that the diode cost will be very high when the number of levels increases, so that for example in the case of five levels the number of clamping diodes increases so that there is a need of more clamping diodes then said semiconductor elements of turn-off type. The converter devices with flying capacitors require for sure no clamping diodes, but they require instead a large number of capacitors, and the capacitor size increases with a comparatively large factor when the number of levels is increased, in which this factor is for example five to six when it is changed from three to five levels. Accordingly, this solution is also very costly.

SUMMARY OF THE INVENTION

The object of the present invention is to provide a converter device of the type defined in the introduction, which is well suited for high voltage and high power applications and in which the drawbacks mentioned above of such devices already known are reduced to a large extend, primarily at an increased number of levels of the converter.

This object is according the invention obtained by connecting a semiconductor element of turn-off type in anti-parallel with each of said second diodes in a device of the type mentioned in the introduction, and that the apparatus is adapted to control the semiconductor elements of the units between the two second mid points to be turned on and turned off with a pulse width modulation frequency of at least one order of magnitude higher than the fundamental frequency of the alternating voltage of said alternating voltage phase line and to control the semiconductor elements connected in anti-parallel with said second diodes and in the units between the respective second mid point and the respective pole to be turned on and turned off with a frequency being substantially lower than said pulse width modulation frequency and within or close to the frequency range one or a couple of times said fundamental frequency.

By arranging a semiconductor element of turn-off type in this way in anti-parallel with said second diodes it is possible to also control the connection of the mid point of the direct voltage side to the second mid point, and it gets possible to obtain a desired pulse width modulation pattern at the connection of the phase line to the phase output by turning these semiconductor elements on and off as well as those arranged between said second mid point and the respective pole with a comparatively low frequency in the order of the fundamental frequency of the alternating voltage of the alternating voltage phase line, whereas the semiconductor elements of the "inner" units are turned on and off with a significantly higher frequency, more exactly the so called real pulse width modulation frequency. The frequency through which the semiconductor elements first mentioned are switched may for example be 50 or 60 Hz, while the pulse width modulation frequency is typically 1–2 kHz. This means that totally different, more exactly lower, demands are made upon the semiconductor elements first mentioned, which have not to be turned on and turned off with any high frequency, which means that for this semiconductor elements having a considerable better ability to hold high voltages may be used, since such high voltage semiconductor elements cannot take high frequencies without unacceptably high switching losses. Voltages in the order of 10–400 kV are normally handled in devices of this type, and this requires then a series connection of a higher number of semiconductor elements within each said unit for a series connection of a higher number of said units so as to distribute the voltage these have to hold in the blocking state among a high number of such semiconductor elements.

Thus, in the present case it will be possible to use a lower number of semiconductor elements connected in series between said second mid point and the respective pole, since these may be of high voltage type, for example hold 4–6 kV instead of 2–3 kV, which means a considerable saving of costs and simplifies the control of the device. Semiconductor elements with a smaller component area may alternatively be used, which have a higher thermal resistance, but which are available to a low cost, may be used for these semiconductor elements switched comparatively seldom. The same condition is valid for the semiconductor elements connected in anti-parallel with the second diodes and switched with a low switching frequency.

According to a preferred embodiment of the invention the apparatus is adapted to control the semiconductor elements connected in anti-parallel with said second diodes and in the units between the respective second mid point and the respective pole with a frequency coinciding with said fundamental frequency in absence of voltage harmonics in the alternating voltage phase line. A large difference in frequency between the control of these semiconductor elements and the other semiconductor elements is obtained by this and the advantages mentioned above of the invention with respect to the devices already known will by this be very remarkable. The apparatus is advantageously adapted, when said voltage harmonics occur to optionally carry out one or several additional switchings of the semiconductor elements connected in anti-parallel with said second diodes and those in the units between the respective second mid point and the respective pole within a fundamental frequency period, in which a switching is defined as comprising a turn-off and turn-on. It may in this way be compensated for such instabilities, in which the frequency in question may during a very short period of time become for example three times said fundamental frequency, but it is still considerably lower than the pulse width modulation frequency.

According to another preferred embodiment of the invention the apparatus is adapted to control the semiconductor elements of the units and the semiconductor elements connected in anti-parallel with said second diodes to alternatingly connect the alternating voltage phase line to an odd number of different levels, in which one of them is the mid point of the direct voltage side and just as many are positive as negative, in which said number is n, which is at least five, that at least (n−1)/2 of said units are connected in series between the second and the first mid point, that it comprises (n−3)/2 so called flying capacitors and that each said flying capacitor is connected with one pole thereof to a mid point of said series connection, which is located between the phase output and the second mid point on the opposite side of the phase output with respect to the connection mid point belonging to the opposite pole thereof and has at least one unit between itself and the second mid point and another unit between itself and another capacitor connection or the phase output. Such a multi-level converter device with a higher number of levels than another converter device, which has for example three levels, results in a better adaptation of the pulse width modulation pattern to the sinus wave desired to be obtained downstream of an inductor or transformer arranged in said alternating voltage phase line, so that the harmonics generated during the conversion are reduced or the size of these inductors and/or filters for extinguishing such harmonics may be reduced, lower voltage differentials may be obtained for said inductors or transformers, so that stresses thereon may be reduced and these may be made less costly, and lower switching losses may be obtained. Such converter devices with a higher number of levels and the advantages associated therewith may according to this advantageous embodiment of the invention be obtained in a simple way and to a low cost. The advantages of the lower frequency of the semiconductor elements arranged between the respective second mid point and the respective pole as well as the semiconductor elements connected in anti-parallel with said second diodes have been discussed above. In addition thereto, this way to arrange a flying capacitor is very advantageous with respect to the arrangement of flying capacitors of the second type mentioned above of converter devices based upon flying capacitors, since a flying capacitor (s) are connected in such a way that they across the poles thereof will have a considerably lower voltage than in the case of the flying capacitors of the devices already known, more exactly the voltage across the flying capacitor with the highest voltage thereacross is in the invention preferably not more than half the voltage across the entire series connection, which is of a great importance, since the power to be handled by a capacitor is proportional to the square of the voltage, so that the present invention enables a use of flying capacitors while avoiding the large number of clamping diodes which would be necessary in the case of a converter device of the type first mentioned, and the drawbacks of the second type of converter devices based upon flying capacitors has with respect to requirements of very large capacitors for a large number of levels of the converter device are nevertheless avoided. A large advantage of a converter device according to this embodiment of the invention is accordingly that it is possible to get a five-level-converter to a comparatively low additional cost with respect to a three-level-converter, and it will be easy to modify a three-level-converter.

According to a preferred embodiment of the invention n is 5 and said units are adapted to give the flying capacitor a voltage across the poles thereof substantially equal to U/4n, in which U is the voltage between the two poles of the direct voltage side. The voltage of the flying capacitor may in this way be kept low and the size and the cost thereof may be kept at a low level.

According to another preferred embodiment of the invention the apparatus is adapted to control said units, when one pole of said flying capacitors is connected to said phase output so that the phase current passes said capacitor, to make this connection in one of two ways, which gives substantially the same phase potential on the phase outlet depending upon the instantaneous real level of the voltage between the poles of the capacitor, so that the capacitor is upon said connection charged for a voltage level thereof lower than desired and discharged for a voltage level thereof higher than desired. This process is possible thanks to the fact that there are two possible states giving almost the same potential on the phase output, in which one state may be used for charging the capacitor and the other for discharging the capacitor for a given direction of the phase current. This process means that the capacitance value of the capacitor may be kept at a minimum, with a time constant for the charging and the discharging, respectively, which is a suitable factor higher than the period of time during which the capacitor is normally switched in each of the positions for a given switching frequency.

Further advantages as well as advantageous features of the invention appear from the following description and the other dependent claims.

BRIEF DESCRIPTION OF THE DRAWINGS

With reference to the appended drawings, below follows a description of preferred embodiments of the invention cited as examples.

In the drawings.

DETAILED DESCRIPTION OF PREFERRED EMBODIMENTS OF THE INVENTION

Figure 1:
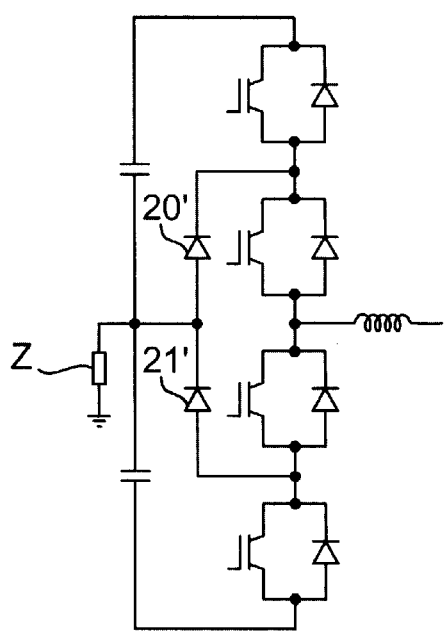
FIG. 1 is a circuit diagram illustrating a voltage stiff forced commutated three-level-converter already known connected to an alternating voltage network through inductors, in which only one phase leg is shown.
Figure 3:
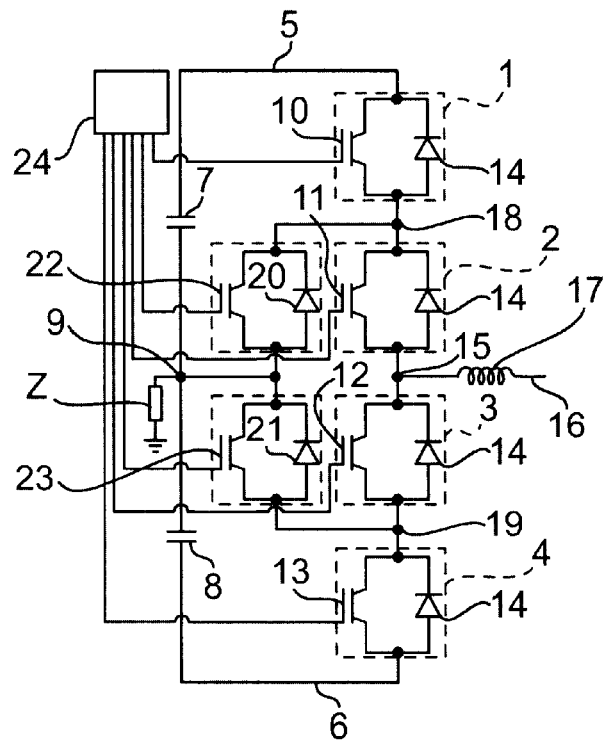
FIG. 3 illustrates the construction of the device according to FIG. 2 for one phase of the alternating voltage network.
Figure 2:
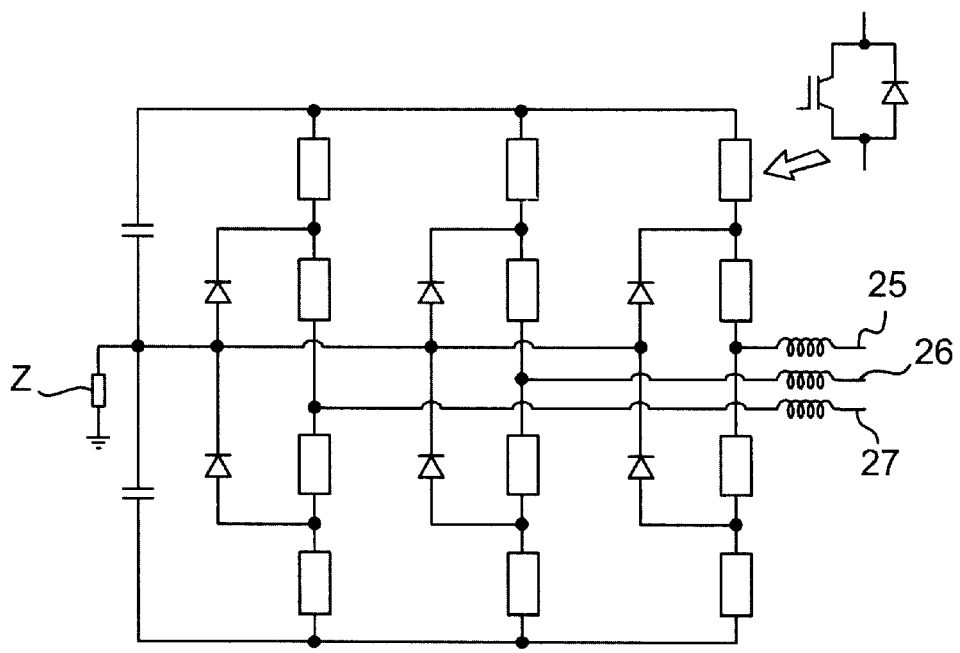
FIG. 2 illustrates a converter device of three-level-type according to a first preferred embodiment of the invention, in which this is connected to a three-phase alternating voltage network through inductors.

The converter device shown in FIG. 1 is a so called NPC (Neutral Point Clamped)-converter device with clamping diodes of a type well known, and this figure is shown here only for comparing the design of this converter device with a three-level-converter device according to a first preferred embodiment of the invention, which is shown in FIGS. 2 and 3 and now will be described with reference to these two figures. Only a part of the converter device connected to a phase of an alternating voltage phase line is shown in FIG. 3, but it is also possible that this constitutes the entire converter device, when this is connected to a one-phase alternating voltage network. The converter device is a so called VSC-converter, which has four units 1–4, usually called transistor valves or alternatively thyristor valves, connected in series between the two poles 5, 6 of a direct voltage side of the device. Two capacitors 7, 8 connected in series are arranged between said two poles, and a point 9 (the mid point of the direct voltage side) therebetween is connected to ground through an impedance Z, in which this impedance may vary from 0 (=direct grounding of the mid point of the direct voltage side) to a value X (=impedance grounding of the mid point of the direct voltage side, through for example a resistance R or an inductance L) up to a value Xmax (=ungrounded mid point, in which the grounding is only determined by the stray capacitance between the mid point of the direct voltage side and ground), so that the potentials +U/2 and –U/2, respectively, are in this way provided at the respective pole, in which U is the voltage between the two poles 5, 6.

The units 1–4 are each made of a semiconductor element 10–13 of turn-off type, such as an IGBT or a GTO, and a first diode 14, a so called free-wheeling diode, connected in anti-parallel therewith. Although only one IGBT or GTO per unit has been shown this may stand for a plurality of IGBTs or GTOs connected in series and controlled simultaneously, which also normally is the case, since a comparatively high number of such semiconductor elements are required for holding the voltage to be held by each unit in the blocking state.

A first mid point 15 of the series connection between the two units 2 and 3, which constitutes the phase output of the converter, is connected to an alternating voltage phase line 16 through an inductor 17. Said series connection is in this way divided into two equal parts with two units 1, 2 and 3, 4, respectively, of each such part.

A second mid point 18, 19 of each said part of the series connection is through a second diode 20, 21 with a conduction direction with respect to the phase output opposite to the conducting direction of the first diode in the unit arranged between this second mid point and the phase output connected to the mid point 9 of the direct voltage side. A semiconductor element 22, 23 of turn-off type, such as an IGBT, is connected in anti-parallel with each second diode. It is also here valid that a great number of semiconductor elements may in practice be connected in series so as to distribute the voltage they have to hold in the blocking state among each of them, although one single semiconductor element has been shown in anti-parallel with each diode.

Furthermore, the device has an apparatus 24 adapted to control the different semiconductor elements and by that ensure that the phase output 15 is connected to and receive the same-potential as the pole 5, the pole 6 or the mid point 9 of the direct voltage side. This apparatus 24 and the arrangement thereof is here very simplified illustrated, and a separate such apparatus could in practice be arranged on high potential at each individual unit and these receive control signals from a control apparatus arranged on ground level. The function of the apparatus will be explained further below.

The converter device shown in FIG. 3 differs with respect to the construction thereof from the NPC-converter device already known shown in FIG. 1 by the replacement of the two clamping diodes 20', 21' by a unit consisting of a semiconductor element of turn-off type and a second diode connected in anti-parallel therewith.

By the new characteristic of the invention, i.e. to replace a clamping diode by a unit comprising a diode and a semiconductor element of turn-off type connected in anti-parallel therewith, completely new possibilities to obtain the different voltage levels desired to be obtained on the phase output 15 are obtained. More exactly it is possible to control the semiconductor elements 11, 12 of the units between the two second mid points 18, 19 through the apparatus 24 as before to be turned on and turned off with a pulse width modulation frequency, which preferably is in the order of 1–2 kHz and at least an order of magnitude, usually 20–40 times higher than the fundamental frequency of the alternating voltage of substantially sinusoidal design to be obtained on the alternating voltage phase line 16 on the opposite side of the inductor 17 with respect to the phase output 15. However, through said replacement of the clamping diodes the semiconductor elements 10, 13 of the units located between the respective pole and the respective second mid point have not to be turned on and turned off with a higher frequency than a frequency in the order of said fundamental frequency any longer, in which the frequency in question preferably is identical to said fundamental frequency, but this may also be a multiple thereof, such as for example three times the fundamental frequency, especially when voltage harmonics occur on the alternating voltage phase line 16, in which the phase voltage may pass zero at more occasions than two times per period. The semiconductor elements 22 and 23 are also controlled with the same frequency as the semiconductor elements 10 and 13. The advantages of not being forced to control the semiconductor elements 10 and 13 with the same high frequency as the semiconductor elements 11 and 12 appear clearly from the disclosure above. +U/2 is obtained on the phase output 15 by turning the semiconductor elements 10 and 11 on, –U/2 is obtained by turning the semiconductor elements 12 and 13 on, while the mid point potential may be obtained either through turning the semiconductor elements 23 and 12 or the semiconductor elements 22 and 11 on.

It is illustrated in FIG. 2 how a converter device according to FIG. 3 is designed for converting direct voltage into alternating voltage and conversely between a direct voltage side and an alternating voltage network with three phases 25, 26, 27. A control for each phase is taking place in accordance with the description made with reference to FIG. 3.

Figure 4:
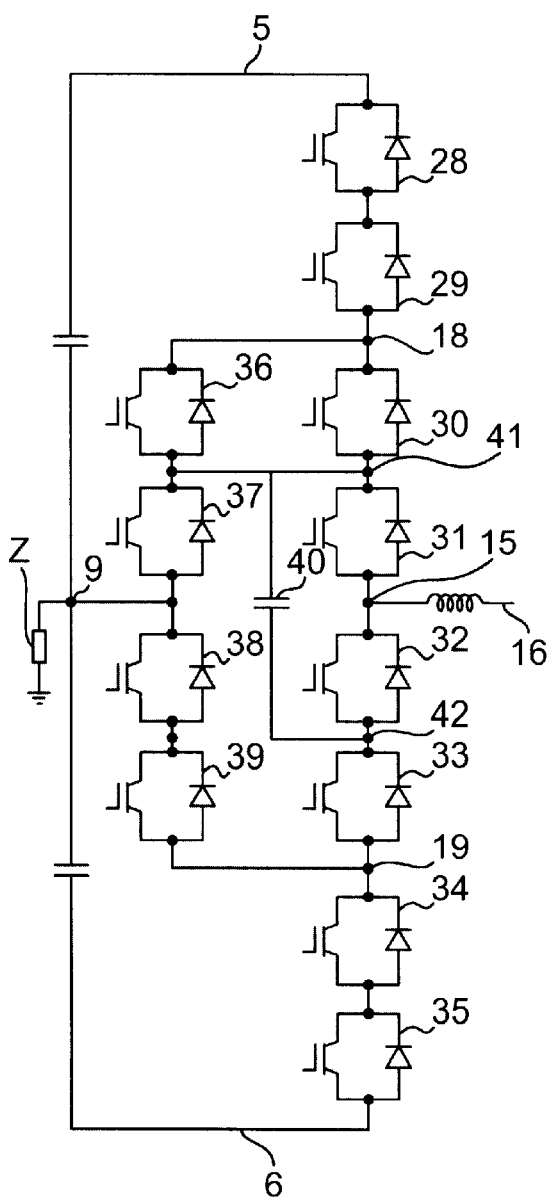
FIG. 4 is a view corresponding to FIG. 3 illustrating a five-level-converter device according to a second preferred embodiment of the invention.

A converter device with respect to one phase according to a second preferred embodiment of the invention is illustrated in FIG. 4 in a view corresponding to FIG. 3, and this differs from the embodiment according to FIG. 3 by the series connection of eight units 28–35 between the two poles 5 and 6, in which four are arranged on each side of the phase output 15. Furthermore, two units are arranged between the respective second mid point 18, 19 and the respective pole. Moreover, two units 36–39 are arranged instead of one such unit between each mid point 18 and 19, respectively, and the mid point 9 of the direct voltage side. Finally, a so called flying capacitor 40 is connected with one pole thereof to a mid point 41, 42 of the series connection of units, which is located between said phase output 15 and the second 18, 19 mid point on the opposite side of the phase output with respect to the connection mid point belonging to the opposite pole thereof and has a unit between itself and the second mid point and a unit between itself and the phase output.

It is possible to obtain five different levels of pulses delivered to the first mid point 15 in this device, namely +U/2, +U/4, 0, −U/4 and −U/2. It is in this device intended to control the units located between the second mid points 18 and 19 as described above with a pulse width modulation frequency and the units 28, 29, 34, 35 located between the respective second mid point and the pole as well as the units 36, 37 and 38, 39 are controlled with a considerably lower frequency in the order of the fundamental frequency of the alternating voltage phase line 16.

The following switch state table indicates the voltage levels obtainable at the first mid point 15 and which switch states preferably should be used so as to obtain these voltage levels.

|  | 28 and 29 | 30 | 31 | 34 and 35 | 33 | 32 | 36 and 37 | 38 and 39 |
|---|---|---|---|---|---|---|---|---|
| V = U/2  | 1 | 1 | 1 | 0 | 0 | 0 | 0 | 1 |
| V = U/4  | 1 | 1 | 0 | 0 | 0 | 1 | 0 | 1 |
| V = U/4  | 1 | 0 | 1 | 0 | 1 | 0 | 0 | 1 |
| V = 0    | 1 | 0 | 0 | 0 | 1 | 1 | 0 | 1 |
| V = 0    | 0 | 1 | 1 | 1 | 0 | 0 | 1 | 0 |
| V = −U/4 | 0 | 1 | 0 | 1 | 0 | 1 | 1 | 0 |
| V = −U/4 | 0 | 0 | 1 | 1 | 1 | 0 | 1 | 0 |
| V = −U/2 | 0 | 0 | 0 | 1 | 1 | 1 | 1 | 0 |

1 and 0 stand in a conventional way for turned on and turned off, respectively.

The following "rules" have been used in this table.
The following couples have the same state:
28, 29 and 38, 39,
34, 35 and 36, 37.
The following couples are complementary:
28, 29 and 36, 37,
34, 35 and 38, 39
28, 29 and 34, 35
30 and 33
31 and 32
36, 37 and 38, 39.

It appear from the table above that the intermediate voltage levels +U/4 and −U/4, respectively, which voltages may be obtained by switching in the flying capacitor 40, which is charged to the voltage U/4, in either direction. This may be obtained in two different ways, which charges or discharges the flying capacitor 40. Which one of these two ways is the one to be used is determined by the voltage of the flying capacitor 40, so that an apparatus corresponding to the apparatus 24 in FIG. 3 controls the different semiconductor elements to choose the way resulting in a charging of the capacitor when the voltage across the poles thereof is too low and a discharging thereof when the voltage thereacross is too high with the aim to keep the voltage across the poles of the capacitor at U/4. The voltage across the capacitor is by that kept almost constant, which means a low energy content and the capacitor may by that be made small, i.e. with a low capacitance.

We assume for the sake of exemplifying that the frequency of the alternating voltage on the phase line 16 is for example 50 or 60 Hz and the converter only has to deliver active or reactive power at this fundamental frequency. The following is then valid: we assume that the converter operates with a pulse width modulation frequency (PWM-frequency) of 1–2 kHz. The inner units 30–33 will then have a mean switching frequency of half the PWM-frequency, i.e. 0,5–1 kHz. The other units 28, 29, 34, 35, 36, 37 and 38, 39 will only switch with the fundamental frequency (50 or 60 Hz), and they will do so either at 0-current (28, 29 and 34, 35) or at 0-voltage (36, 37 and 38, 39). This means that the switching losses will be kept at a low level. This is valid especially for the semiconductor elements 28, 29, 34, 35, 36, 37, 38, 39. But also the semiconductor elements 30–33 will have a lower mean switching frequency than the corresponding 3-level-converter, so that high voltage semiconductor elements in may be chosen, or alternatively semiconductor elements with a smaller area and a higher thermal resistance.

Figure 5:
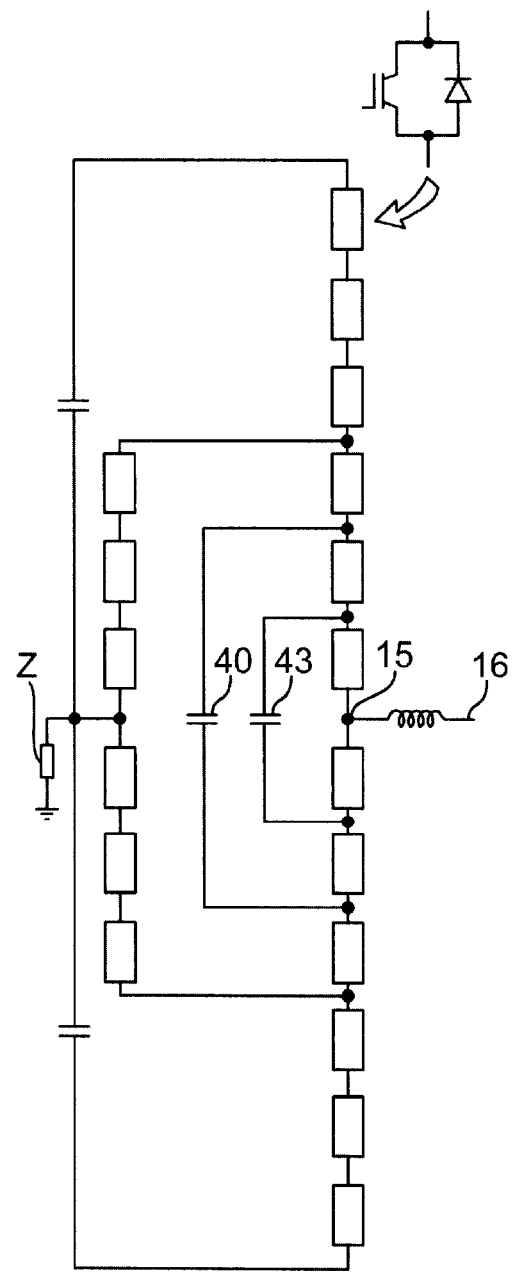
FIG. 5 is a view corresponding to FIGS. 3 and 4, although somewhat simplified, of a seven-level-converter device according to a third preferred embodiment of the invention.

A seven-level-converter device constructed in the same way as the converter device according to FIG. 4 is illustrated in FIG. 5, and the function thereof appear from the description of the device according to FIG. 4. Thus, two flying capacitors 43 are arranged for obtaining different voltage levels, in which the voltage across the outer capacitor 40 will be U/3 and across the inner capacitor 43 U/6. It is possible to continue in this way and by adding further flying capacitors obtain converter devices with more levels, i.e. 9, 11,.

The valves are advantageously so designed that they give the flying capacitors a voltage $U_x$ across the two poles thereof of $$\frac{x \cdot U}{(n-1)},$$

in which x=1, . . .

$$\frac{n-3}{2}$$

and U is the voltage across the two poles of the direct voltage side. This means for example in the case of 9 levels $U_1=U/8$, $U_2=2U/8$ and $U_3=3U/8$.

The invention is of course not in any way restricted to the preferred embodiments described above, but many possibilities to modifications thereof would be apparent to a man with ordinary skill in the art without departing from the basic idea of the invention.

The distribution of the units arranged on both sides of the different mid points of said series connection and between said second mid points and the respective pole may for example be different should that be desired, so that the voltage levels obtained on the first mid point 15 have another mutual relation than shown above.

What is claimed is:

1. A device for converting alternating voltage into direct voltage, and, conversely, direct voltage into alternating voltage comprising:

a series connection of at least four units, each having a turn-off type semiconductor element and a first diode connected anti-parallel therewith, said series connection extending between a positive and negative pole of a direct voltage source;

an alternating voltage phase line connected to a first midpoint dividing the series connection into two parts, said first midpoint constituting a phase output for the series connection;

means providing a midpoint between the two poles of said direct voltage having a voltage difference with each pole which is the same magnitude but of opposite sign;

a pair of second midpoints formed in the series, connected through second diodes to said midpoint between said two poles, said second diodes having a conduction direction with respect to the phase output opposite to the conducting direction of a first diode in the unit connected between the respective second midpoint and the output phase, each of said second diodes having a turn-off type semiconductor element connected anti-parallel with each of said second diodes; and an apparatus for controlling the semiconductor elements of the units to generate a train of pulses according to a pulse width modulation pattern on the phase output, said apparatus alternately connecting the alternating voltage phase line to the midpoint, and the two poles of the direct voltage;

said apparatus controlling the semiconductor elements of the units between the two second midpoints in response to a pulse width modulation frequency of at least one order of magnitude higher than the fundamental frequency of the alternating voltage of the phase line, and controlling the semiconductor elements connected anti-parallel with said second diodes, and in the remaining of said units, with a frequency substantially lower than said pulse width modulation frequency, and substantially the same as a frequency range one or two times said fundamental frequency.

2. A device according to claim 1, wherein in that said apparatus (24) is adapted to control the semiconductor elements (22, 23) connected in anti-parallel with said second diodes (20, 21) and in the units (1, 4, 28, 29, 34, 35) between the respective second mid points and a respective pole with a frequency a multiple of said fundamental frequency.

3. A device according to claim 1, wherein said apparatus (24) is adapted to control the semiconductor elements connected anti-parallel with said second diodes and in the units between the respective second mid point and the respective pole with a frequency coinciding with said fundamental frequency in absence of voltage harmonics in the alternating voltage phase line.

4. A device according to claim 3, wherein said apparatus (24) provides additional switching of the semiconductor elements connected in anti-parallel with said second diodes and those in the units between the respective second mid point and the respective pole within a fundamental frequency period.

5. A device according to claim 1, wherein one or more said units connected in series are controlled simultaneously through the apparatus (24), each of said units semiconductor elements having substantially the same portion of a voltage applied across said series when the semiconductor elements are turned off, two units (1, 2 and 3, 4), respectively are arranged between the phase output (15) and a respective pole (5, 6), a unit (1,4) is arranged between the respective first mid point (18, 19) and the respective pole, that a unit is arranged between the mid point (9) of the direct voltage side and said second mid point (18, 19), wherein the apparatus (24) provides an alternating connection of three different potential levels to the phase output (15).

6. A device according to claim 1, wherein the apparatus (24) controls the semiconductor elements (10–13) of the units and the semiconductor elements (22, 23) connected in anti-parallel with said second diodes to alternatingly connect the alternating voltage phase line to an odd number n where n is at least 5, of different levels, one of said levels being the mid point of the direct voltage side, at least (n–1)/2 of said units are connected in series between the second (18, 19) and the first mid point (15), (n–3)/2 flying capacitors (40, 43), are connected to a mid point (41, 42) between units of said series connection connected between the phase output and the second mid points.

7. A device according to claim 6, wherein n is 5, and that it has one said flying capacitor (40).

8. A device according to claim 7, wherein said units are adapted to provide the flying capacitor (40) a voltage substantially equal to U/4, in which U is the voltage between the two poles of the direct voltage side.

9. A device according to claim 7, wherein said series connection has eight units (28–35), in which each unit is adapted to take substantially the same portion of a voltage applied to one or more such units connected in series when the semiconductor elements included therein are turned off, that four units (28–35) are arranged between the phase output and the respective direct voltage pole, two units (28, 29, 34, 35) are arranged between the respective second mid point and the respective direct voltage pole, that a unit (31, 32) is arranged between the respective connection (41, 42) of the flying capacitor (40) to the series connection and the phase output (15), and that two units (36–39) are connected in series between the mid point of the direct voltage side and said second mid point.

10. A device according to claim 6, wherein n is 7.

11. A device according to claim 9, having two flying capacitors (40, 43), the inner capacitor (43) connected to said series connection closest to the phase output (15) has a voltage of U/6 across the poles thereof and a second, outer capacitor (40) has a voltage U/3 across the poles thereof, in which U is the voltage between the two poles of the direct voltage side.

12. A device according to claim 6, wherein the units provide the flying capacitors (40, 43) a voltage $U_x$ across the two poles thereof of $$\frac{x \times U}{(n-1)} \text{ in which } x = 1, \ldots \frac{n-3}{2}$$

and U is the voltage across the two poles of the direct voltage side.

13. A device according to claim 6, wherein the apparatus (24) controls said unit, so that when one pole of said flying capacitors (40, 43) is connected to said phase output in one of two ways the phase current passes said capacitor to provide substantially the same phase potential on the phase outlet depending upon the instantaneous real level of the voltage between the poles of the capacitor, so that the capacitor is charged for a voltage level thereof lower than desired and discharged for a voltage level thereof higher than desired.

14. A device according to claim 1, wherein said semiconductor elements are IGBTs (Insulated Gate Bipolar Transistor).

15. A device according to claim 1, wherein said semiconductor elements are GTOs (Gate Turn-Off thyristor).

16. A device according to claim 1, wherein said direct voltage side is formed by a direct voltage network for transmitting high voltage direct current (HVDC) and the alternating voltage phase line belongs to an alternating voltage network.

17. A device according to claim 1, incorporated in a SVC (Static Var Compensatory with the direct voltage side formed by capacitors hanging freely and the alternating voltage phase line connected to an alternating voltage network.

18. A device according to claim 1, wherein it has at least two alternating voltage phase lines (16, 25–27) included in a multiple-phase alternating voltage network, each having one of said series connection and second diodes associated therewith connected in parallel with each other between said poles of the direct voltage side and having semiconductor elements of turn-off type connected anti-parallel therewith for each phase line.

19. A device according to claim 18, wherein the number of phases of the alternating voltage network is three.

20. A device according to claim 2, wherein said apparatus is adapted to control the semiconductor elements connected anti-parallel with said second diodes and in the units between the respective second mid point and the respective pole with a frequency coinciding with said fundamental frequency in absence of voltage harmonics in the alternating voltage phase line.

* * * * *